United States Patent
Ranganathan et al.

(10) Patent No.: US 7,861,102 B1
(45) Date of Patent: Dec. 28, 2010

(54) UNIFIED POWER MANAGEMENT ARCHITECTURE

(75) Inventors: Parthasarathy Ranganathan, Fremont, CA (US); Ramya Raghavendra, Goleta, CA (US); Xiaoyun Zhu, Cupertino, CA (US); Zhikui Wang, Sunnyvale, CA (US); Vanish Talwar, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 858 days.

(21) Appl. No.: 11/796,962

(22) Filed: Apr. 30, 2007

(51) Int. Cl.
 G06F 1/00 (2006.01)
 G06F 1/26 (2006.01)
 G06F 1/32 (2006.01)
 G06F 11/30 (2006.01)

(52) U.S. Cl. .................. 713/300; 713/320; 713/322; 713/323; 713/340

(58) Field of Classification Search ........... 713/300, 713/320, 322, 323, 340
See application file for complete search history.

(56) References Cited

U.S. PATENT DOCUMENTS

| | | | |
|---|---|---|---|
| 7,337,339 B1* | 2/2008 | Choquette et al. | 713/320 |
| 7,386,739 B2* | 6/2008 | Ghiasi et al. | 713/300 |
| 7,421,601 B2* | 9/2008 | Bose et al. | 713/320 |
| 2005/0138440 A1* | 6/2005 | Barr et al. | 713/300 |
| 2006/0082222 A1* | 4/2006 | Pincu et al. | 307/29 |
| 2008/0077817 A1* | 3/2008 | Brundridge et al. | 713/340 |
| 2008/0082844 A1* | 4/2008 | Ghiasi et al. | 713/323 |
| 2008/0109811 A1* | 5/2008 | Krauthgamer et al. | 718/104 |
| 2008/0178018 A1* | 7/2008 | McGrane et al. | 713/320 |
| 2008/0178029 A1* | 7/2008 | McGrane et al. | 713/324 |

OTHER PUBLICATIONS

Ranganathan, P. et al., "Simulating Complex Enterprise Workloads Using Utilization Traces", downloaded Apr. 30, 2007.
HP Power Regulator, http://h18004.www1.hp.com/products/servers/ management/ilo/power-regulator.html , downloaded Apr. 30, 2007.

* cited by examiner

*Primary Examiner*—Vincent T Tran (57) ABSTRACT

A power management system for providing a unified power management of at least one electronic system in a selected environment is provided, wherein the at least one electronic system includes a plurality of electronic components. The power management system includes a first controller module operating at the at least one electronic system in the selected environment to generate a first power control of the each electronic component based at least on a system power budget for the at least one electronic system; a second controller module operating at each of the electronic components to generate a second power control of the each electronic component based at least on a component power budget for the each electronic component; and a third controller module operating at each of the electronic components to modify a power-performance state of the each electronic component based on a target resource utilization level, wherein the target resource utilization level is based at least on the first and second power controls.

18 Claims, 7 Drawing Sheets

UNIFIED POWER MANAGEMENT ARCHITECTURE

BACKGROUND

Power and cooling (power/cooling) are emerging to be key challenges in electronic system environments that have racks of electronic equipment interconnected in a hierarchical manner. One example of such an electronic system environment is a data center environment that has racks of computer equipment and media storage equipment interconnected hierarchically via network switches, routers, or both. For large data centers, the power consumption can cost several millions of dollars per year in electricity costs. Additionally, increasing power density leads to large costs—both capital and recurring—for power delivery and cooling. The power density also has implications on metrics like compaction, reliability, and uptime. An added motivation to address this problem has come in the form of governmental agencies (e.g., EPA, Intelligent Energy Europe, TopRunner) actively seeking to regulate enterprise power. As a consequence of these trends, there has been a lot of focus within the community on power and cooling. Individual groups designing solutions for the data center all are focusing on power management as a key differentiator for their offerings.

While there has been a lot of progress made on the power/cooling problem, one of the key challenges has been the fact that the proposed solutions only address individual aspects of the problem in isolation. Different solutions regulate power in different ways (e.g., voltage scaling, virtual machine consolidation, power-aware resource scheduling), at different implementation levels (e.g., chip, server, enclosure, datacenter), from different aspects of the solution stack (e.g., hardware, software, firmware), and with varying goals and tradeoffs (e.g., energy, power, heat, energy delay). For example, commercial products already exist that address average power through control of power states, or P states, defined by the Advanced Configuration and Power Interface (ACPI) standard, at the platform level. Additionally, there exist power capping solutions that address peak power at the processor level and at the blade server level. Similar power management can also be implemented at the software level, such as at the operating system (OS) or at the distributed resource scheduler. There also exist solutions that leverage virtual machine (VM) consolidation for power management. Accordingly, the many individual power/cooling solutions occupy a well-populated multidimensional grid across the four axes of mechanisms, implementation level, solution-stack level, and objective function.

BRIEF DESCRIPTION OF THE DRAWINGS

Embodiments are illustrated by way of example and not limited in the following figure(s), in which like numerals indicate like elements, in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

In the absence of coordination between the various individual power/cooling solutions, they are likely to interfere with one another, in unpredictable and potentially dangerous ways. For example, if the power efficiency controller sets P-states without coordination with the power capping algorithm, this can potentially lead to cases where the system enters thermal failover because the power budget is exceeded. Similarly, in the absence of coordination between the VM level power management and local power management, the amount of power savings can be dramatically reduced. Indeed, we have several anecdotal instances of such occurrences. Thus, none of the existing power/cooling solutions in the power management space have so far systematically and comprehensively addressed a unified power management architecture that coordinates all these individual power/cooling solutions.

Accordingly, described herein are methods and systems for a unified power management (UPM) architecture or framework that coordinates the various power management optimizations in an electronic system environment, such as a data center. The UPM architecture is operable to provide interfaces and interrelationships between the various power controllers at different implementation levels (e.g., chip, server, rack enclosure, data center), even when given the constraints imposed by the time constants at different levels. It is also operable to reconcile varying goals of the individual power controllers (e.g., tracking vs. capping vs. optimization, local vs. global) with different tradeoffs (e.g., energy, power, hat, power performance) at different aspects of the solution stack (hardware, software, firmware). The UPM architecture is further operable to integrate the different mechanisms (e.g., voltage scaling, VM consolidation, job scheduling) for power control used by the individual power controllers.

The power management problem in an electronic system environment, such as a data center, may be broadly taxonimized in several axes. A key axis is whether the power controller focuses on average power or peak power. As referred herein, a power controller is logic that is associated with implementing a given power solution, and it may be implemented by a software application or module. The average power relates to the electricity consumed by the servers. Typically, the goal is to consume the minimum power needed to achieve the required performance. The peak power, on the other hand, relates to the provisioning in the data center. This may involve both electrical provisioning (e.g., how much current is routed into the data center) and thermal provisioning (e.g., what is the heat extraction capacity of the cooling?). Given the dire consequences with violating the power budget, such as a "fuse" blow-up or a system heat-up and shut-down (thermal failover), optimizations in this area tend to be conservative about meeting power budgets even at the expense of throttling some performance. One leeway that is often available is the ability to transiently violate the power budget, particularly with the thermal power budget cases. Given that thermal failover happens only when the power budget is violated for a sustained period of time that creates enough heat to increase the temperature beyond normal operating points, an occasional bounded violation of power budget is allowable. Most power supplies similarly support the ability to have transient spikes in current drawn, but these transients need to be small enough (sometimes microseconds) that for all practical purposes, these are strict budgets for software controllers.

An alternate axis of classifying work in this area is the level at which power is controlled. This may be at the individual component level (e.g., processor, memory level, disk-level control), at the individual platform level (e.g., server-level power management), at the distributed systems level (e.g., blade-enclosure level or data center cluster level). As noted earlier, a power controller is operable to address either peak power or average power. The key differences between the various controllers is the scope of the objective function that is being optimized though typically, the time constants of control also vary across the different levels. An associated axis of categorizing power management solutions is based on whether the solution is implemented at the hardware or software level. For example, the platform-level power management may be implemented in firmware in a management processor, or it may be implemented in software in the OS. Similarly, the distributed-systems power management may be implemented at the enclosure controller (e.g., in a blade system) or at a distributed resource scheduler.

Another dimension to the problem is that multiple power controllers may exist at each level. For example, a VM consolidation solution for power management may potentially coexist with a distributed job scheduler solution for power management. Sometimes, different power controllers may exist at the same level to leverage different mechanisms. For example, one power controller may manage voltage and frequency states in a processor while another may manage the on/off control. Finally, the power controllers may be different in terms of whether they optimize for a purely local objective function, or they are aware of a global objective function.

Architecture

Figure 1:
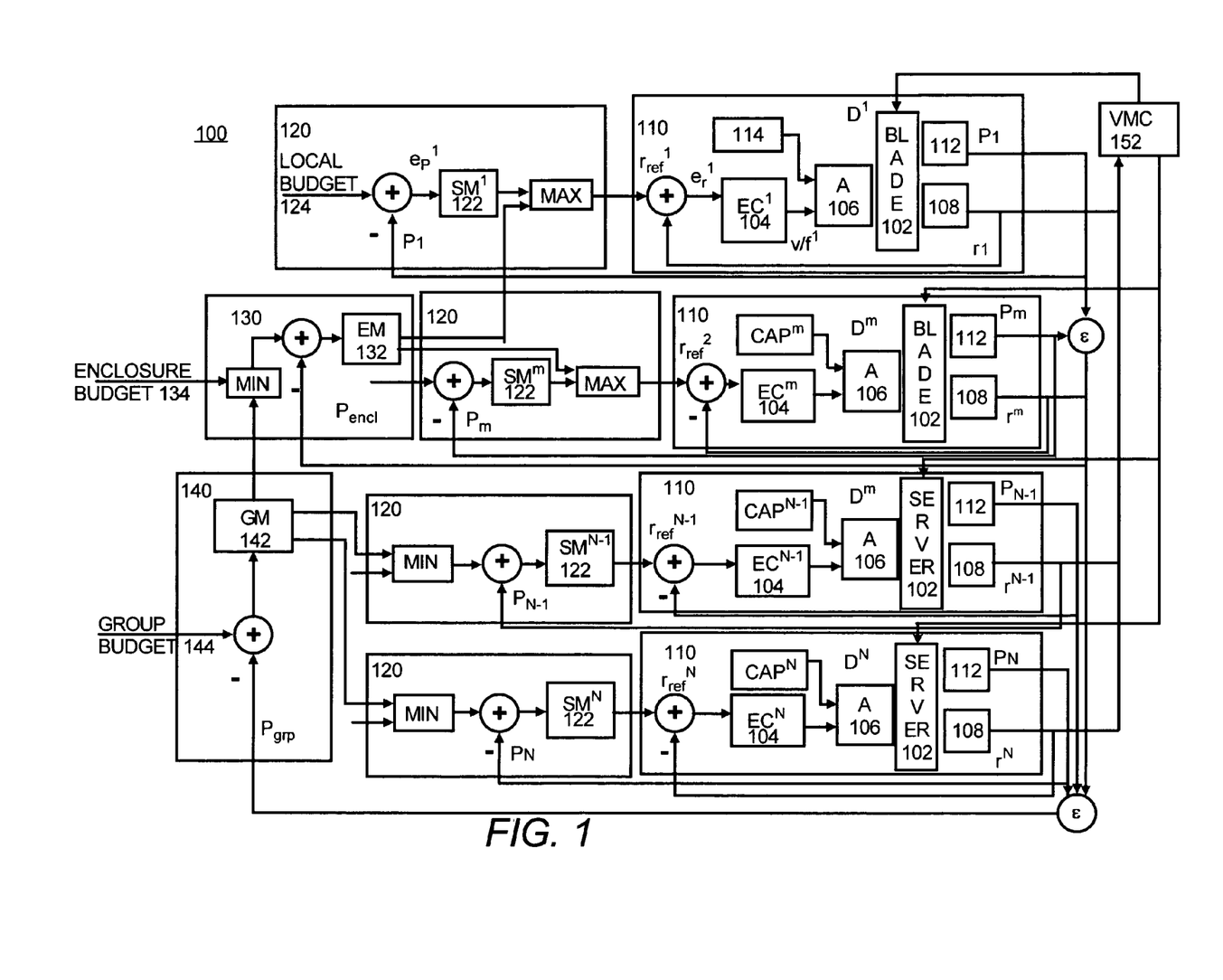
FIG. 1 illustrates a unified power management architecture or framework, in accordance with one embodiment.

FIG. 1 illustrates an UPM architecture 100 that integrates five different power management solutions: (1) a power management solution 110 at the individual server level, (2) a power capping solution 120 at the individual server level, (3) a power capping solution 130 at the blade enclosure level, (4) a power capping solution 140 at the rack enclosure level, and (5) a power management solution at the distributed system level 150 (similar to VM migration or workload consolidation), in accordance with one embodiment. As shown, the UPM architecture 100 is implemented for a rack enclosure with N servers, as denoted by the blade servers 102, where the first m servers (1 . . . m) belong to a blade enclosure, and others (e.g., N−1 and N) are individual servers directly mounted to the rack. However, it should be understood that the UPM architecture 100 may be scaled to accommodate an electronic system environment of any size, such as a data center with multiple racks, where each rack can have more than one subsystem enclosures (e.g., blade enclosures) and multiple individual servers.

The UPM architecture 100 employs multiple feedback power controllers to allow systems or components therein to dynamically adapt to changes in workloads and system parameters. Each feedback controller is designed based on a model that characterizes the input-output relationships of an associated system or component being controlled, wherein inputs are actuator knobs that can be dynamically adjusted, and outputs are certain metrics (data measurements) of the associated system or component that the power controller cares about. The power controller then automatically tunes the actuator knobs based on the error between the measured values and target values for the output metrics in order for the measured values to track the target values. The use of control theory in feedback designs makes it possible to offer formal guarantees for stability and performance.

The UPM architecture 100 further employs a nested structure for the multiple feedback power controllers at various levels that may be implemented in a distributed fashion. The innermost loop of the UPM architecture 100 is a power management solution or "power-efficiency loop" 110 that employs an efficiency controller (EC) 104 that periodically optimizes the clock frequency of an associated server 102 via one or more actuator knobs 106. In one embodiment, each server 102 is considered as a "resource container" with a target value $r_{ref}$ representing the desired utilization of the container. The current resource utilization of the container may be measured using OS calls via a sensor module (Sr) 108. Regulating resource utilization around its target drives the EC 104 to dynamically resize the container such that the power automatically adapts to the total demand the workloads place on the associated server 102 in real time. At the same time, the EC 104 maintains certain buffer capacity in the container to ensure good application performance. The resizing is done through control of P states, which are different power-performance states defined by the ACPI interface (actuator 106), and involves changing the clock frequency and the operating voltage of a processor in the server 102. For example, if $r_{ref}$ is set to 75%, and a server 102 has a CPU utilization of only 10% due to light workload, the EC 104 may resize the container that represents the server 102 by transitioning the server processor from a higher P state (higher clock frequency) towards a lower P state (lower clock frequency), which leads to lower power consumption.

The power capping solution 120 at the server level 110 is implemented as a second power controller, denoted as a server manager (SM) 122, that is nested outside of the power-efficiency loop to dynamically set the $r_{ref}$ value for the latter. The role of the SM 122 is to ensure that the power consumption of the server 102, as measured by a sensor module (Sp) 112, does not exceed a local power budget 124. This power budget, may be provided by data center operators based on thermal budget constraints, or determined by high-level power managers. If the local power budget 124 is exceeded, the SM 122 increases the $r_{ref}$ value for the server 102 in order to reduce power, at the expense of possible performance loss. Because the SM 122 is a thermal power capper, it allows a few temporary transients. The length of time the local power budget 124 is violated is bound by the SM 122, however. In the event that the power capper 120 needs to be faster than the power-efficiency loop 110, an alternative overwriter block, denoted as a CAP 114, is implemented in parallel to the nested EC 104 and may directly adjust the clock frequency to throttle power.

The next level of the UPM architecture 100 employs a third power controller, denoted as an enclosure manager (EM) 132, to implement the power capping solution 130. In this case, the EM 132 monitors the total power consumption of the enclosure, via the Sp 112 at each server 102, and compares it with an enclosure-level power budget 134. It then determines the appropriate $r_{ref}$ values for all the servers (1 . . . m) in the enclosure such that the total power consumed by the enclosure stays below its enclosure power budget 134. At the server level, the maximum of the calculated $r_{ref}$ values from the EM 132 and the SM 122 is then fed into the power-efficiency loop 110. The group-level power capper 140 is implemented by a fourth power controller, denoted as a group manager (GM) 142, which works at either the rack level or the data center level. It performs the same functions as the EM 132 does, except that, instead of manipulating the $r_{ref}$ values directly, the GM 142 determines the power budgets for both the individual enclosures and the individual servers that are not in an enclosure to ensure that the aggregate power consumption stays below a given group-level budget 144.

The next level of the UPM architecture 100 employs a fifth power controller, denoted as a virtual machine controller (VMC) 152. This controller implements an optimizer function that periodically adjusts the placement of workloads on all the servers 102 in order to minimize the aggregate power for the whole rack or data center. In cases where workloads have been consolidated onto few servers, the remaining servers that are idle will be turned off, which leads to greater power savings compared to running the server in a lower P-state. These servers may be turned on again if they are needed later. Given that this optimization is done online, the UPM architecture 100 responds dynamically to changes in workloads to converge to a desired steady state. In addition, because the decisions at this stage affect the decisions at the other stages, a set of constraints on the workload placement solutions may be implemented at this stage to reduce the likelihood of performance loss and power budget violation in the UPM architecture 100. Also, it should be noted that all of the aforementioned power controllers may work at different time constants, as described later.

Figure 2:
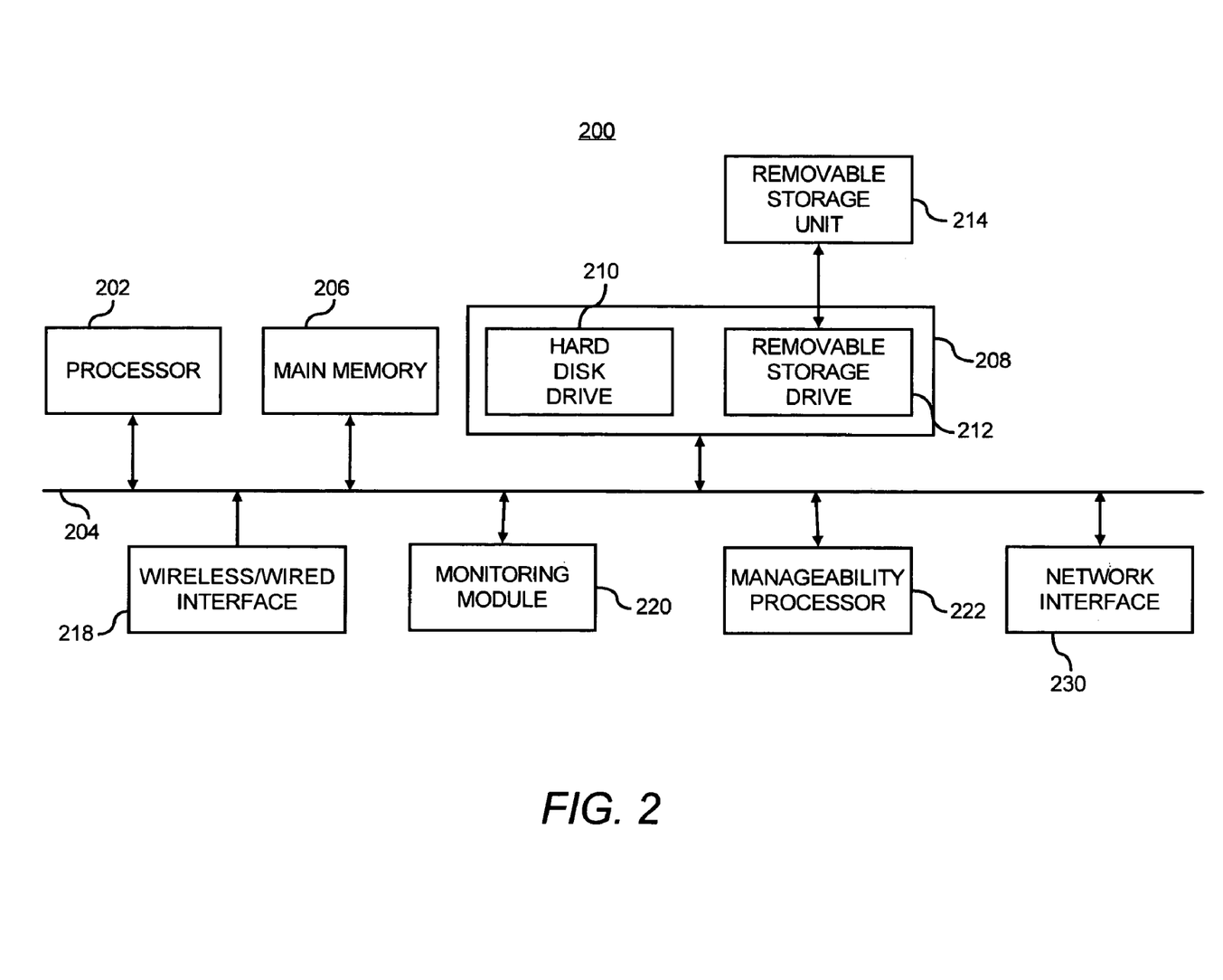
FIG. 2 illustrates a block diagram of a computerized system wherein one or more system components of a unified management architecture may be practiced, in accordance with one embodiment.

FIG. 2 illustrates a block diagram of a computerized system 200 that is operable to be used as a platform for implementing all of the power controllers in FIG. 1. Alternatively, the computerized system 200 is operable as a platform for implementing each of the power controllers, or any combination thereof. The computer system 200 includes one or more processors, such as processor 202, providing an execution platform for executing software. Thus, the computerized system 200 includes one or more single-core or multi-core processors of any of a number of computer processors, such as processors from Intel, AMD, and Cyrix. As referred herein, a computer processor may be a general-purpose processor, such as a central processing unit (CPU) or any other multi-purpose processor or microprocessor. A computer processor also may be a special-purpose processor, such as a graphics processing unit (GPU), an audio processor, a digital signal processor, or another processor dedicated for one or more processing purposes. Commands and data from the processor 202 are communicated over a communication bus 204 or through point-to-point links with other components in the computer system 200.

The computer system 200 also includes a main memory 206 where software is resident during runtime, and a secondary memory 208. The secondary memory 208 may also be a computer-readable medium (CRM) that may be used to store software programs, applications, or modules that implement the aforementioned power controllers, or parts thereof. The main memory 206 and secondary memory 208 (and an optional removable storage unit 214) each includes, for example, a hard disk drive and/or a removable storage drive 212 representing a floppy diskette drive, a magnetic tape drive, a compact disk drive, etc., or a nonvolatile memory where a copy of the software is stored. In one example, the secondary memory 408 also includes ROM (read only memory), EPROM (erasable, programmable ROM), EEPROM (electrically erasable, programmable ROM), or any other electronic, optical, magnetic, or other storage or transmission device capable of providing a processor or processing unit with computer-readable instructions. The computer system 200 includes user interfaces that include one or more input devices 218, such as a keyboard, a mouse, a stylus, and the like. A network interface 230 is also provided for communicating with other computer systems via, for example, a network.

In an alternative embodiment, there is provided a manageability processor or application-specific integrated circuit (ASIC) 222 that is dedicated for power management to implement and control the various power controllers described earlier, while the processor 202 is tasked with other duties. Also, computer system 200 may further include a monitoring module 220 that is in communication with the various servers 102 (FIG. 1) to receive power consumption and resource utilization measurements from the Sp 112 and Sr 108 of each server.

Process

Figure 3A:
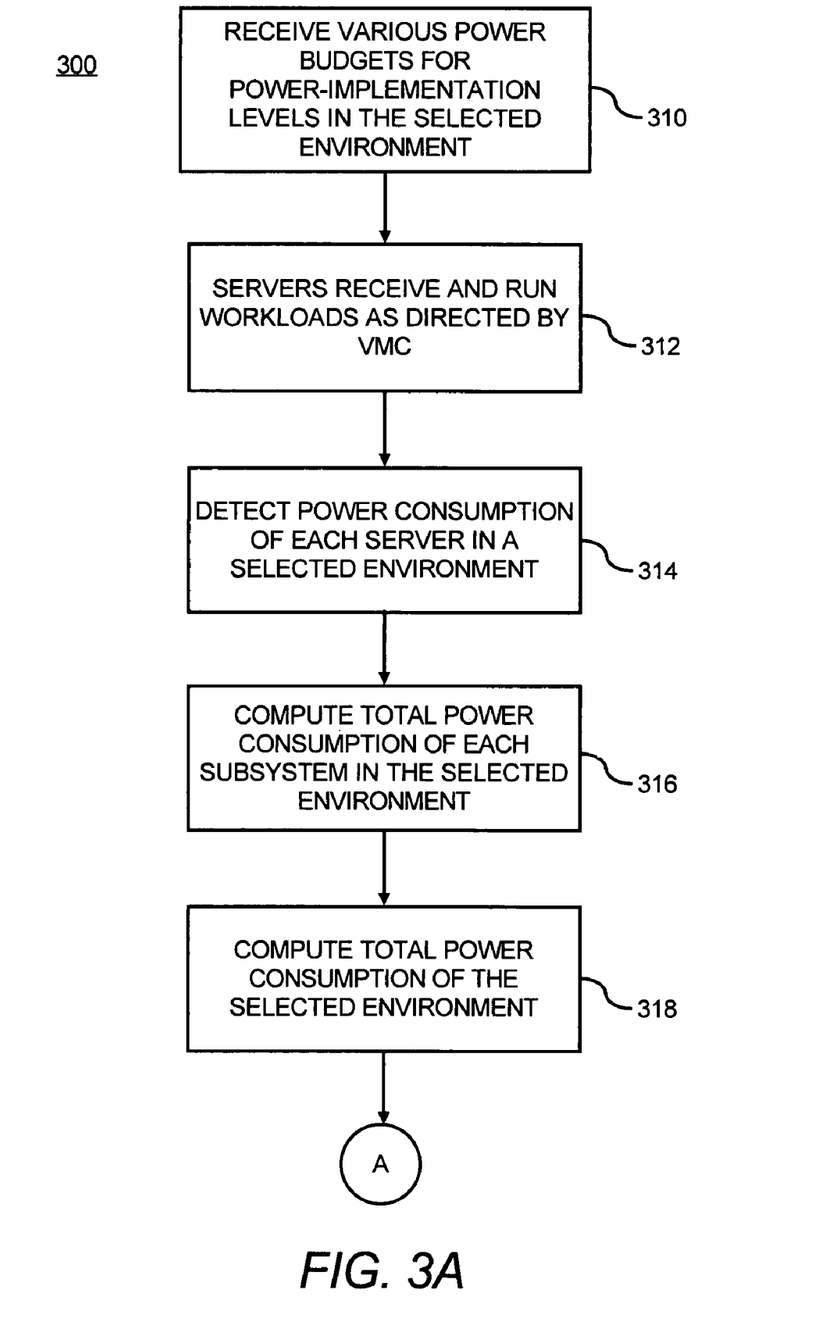
FIGS. 3A-B illustrate a method for providing a unified power management of an electronic system environment, in accordance with one embodiment.
Figure 3B:
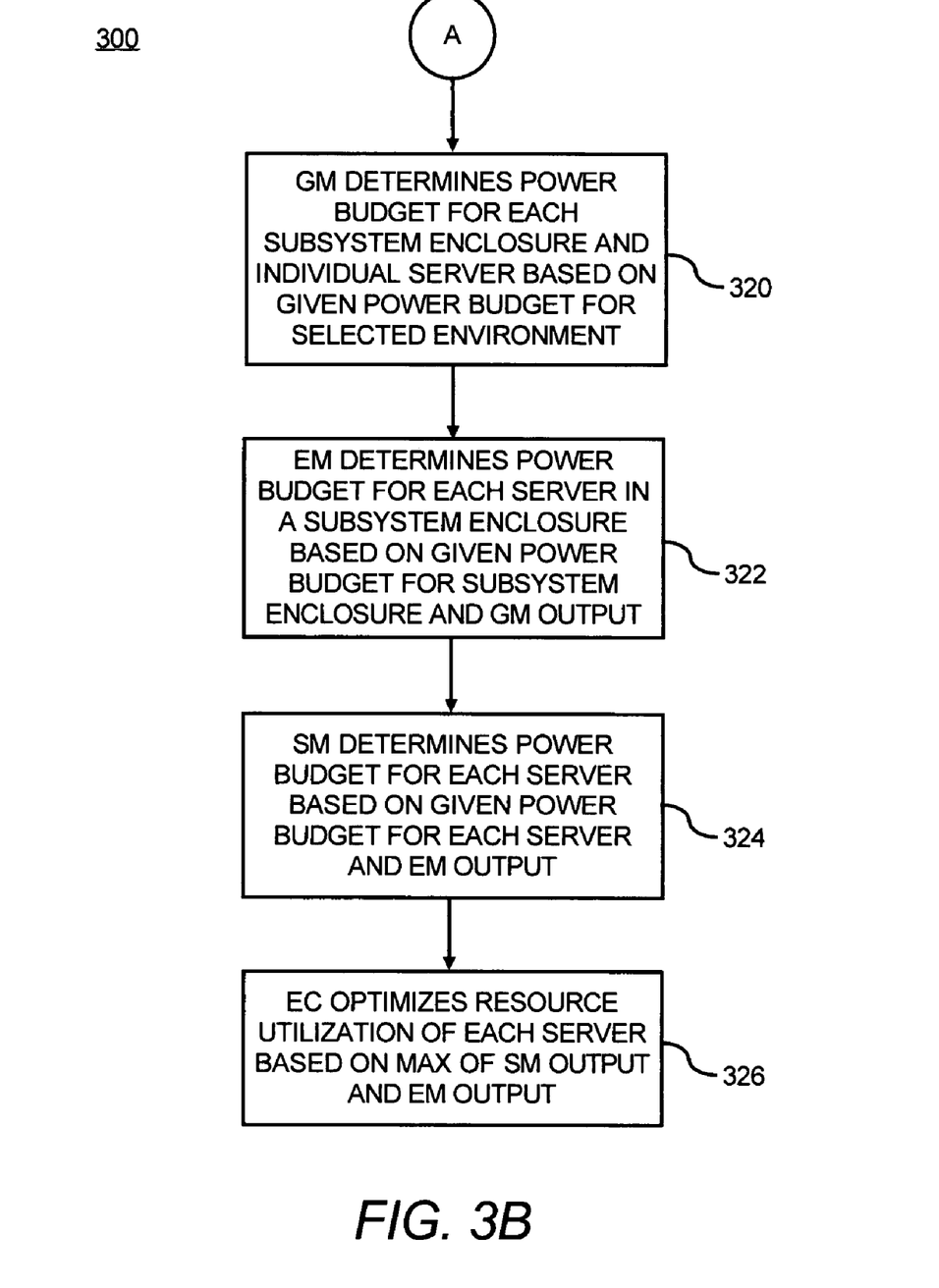

FIGS. 3A-B illustrate a method 300 for providing a unified power management of an electronic system environment, such as a data center, in accordance with one embodiment. For illustrative purposes only and not to be limiting thereof, the method 300 is discussed in the context of the UPM architecture 100 illustrated in FIG. 1.

At 310, the UPM architecture 100 for providing power management of a selected electronic system environment, such as a rack enclosure in a data center, receives the following inputs: one or more local power budgets 124, one or more enclosure power budgets 134, and one or more group power budgets 144 for different power-implementation levels within the rack enclosure. The local power budget 124 is for each electronic component, e.g., server 102, in the rack enclosure and used by the SM 122 therein. The enclosure power budget 134 is for each subsystem enclosure, such as a blade enclosure, and used by the EM 132. The group power budget 144 is for the system enclosure, such as a rack enclosure, and used by the GM 142. As noted earlier, the various power budgets may be provided by system users or operators based on thermal budget constraints or determined by high-level power human managers based on any number of desired criteria.

At 312, workloads are received by the servers 102 due to workload placements by the VMC 152. At the beginning, when the UPM architecture 100 is first placed in operation, one or more initial workloads may be received by one or more servers 102, and each server goes online for operation to run whatever initial workloads that is assigned to it by the VMC 152. As noted earlier, the VMC 152 periodically adjusts the placement or assignment of workloads on all the servers 102 in order to minimize the aggregate power for the whole rack enclosure (or data center). The operation of the VMC 152 is further described later.

At 314, the power consumption at each server 102 as it runs whatever assigned workloads is detected at the associated sensor module Sp 112.

At 316, the power consumptions of all servers 102 in each subsystem or blade enclosure in the UPM architecture 100 are summed up, and the computed total power consumption of the blade enclosure is provided or fed to an associated EM 132 for each blade enclosure. In one embodiment, the total subsystem power consumption may be computed via hardware or software (or both) that is separate from the EM 132. In an alternative embodiment, the total subsystem power consumption may be computed by the EM 132 as it receives data from the Sp 112 at each server 102.

At 318, the total power consumption of all servers 102, i.e., of the entire rack or system enclosure, is also computed and provided or fed to the GM 142 associated with the rack enclosure. In one embodiment, the total system power consumption may be computed via hardware or software (or both) that is separate from the GM 142. In an alternative embodiment, the total system power consumption may be computed by the GM 142 as it receives data from the Sp 112 at each server 102.

At 320, the GM 142 determines the power budgets for both the individual subsystem or blade enclosures and the individual servers 102 that are not in a subsystem enclosure to ensure that the aggregate power consumption does not rise above the given group-level power budget 144. Thus, the GM 142 outputs power budgets or controls for each individual subsystem or blade enclosure and each individual server external to such a subsystem enclosure based on a difference between the total power consumption of the group and the given group-level power budget 132 for the entire rack enclosure. The operation of the GM 142 is further described later.

At 322, the EM 132 determines the power budgets for the individual servers 102 within its associated blade enclosure to ensure that the aggregate power consumption stays below either the enclosure-level power budget 134 or the endosure budget determined by GM142, whichever is less. Thus, the EM 132 outputs power budgets or controls for each server 102 in the associated blade enclosure based on an observed difference between: a) the lesser of the enclosure power budget 134 and the budget set up by the GM142, and b) the total power consumption of the blade enclosure. The output power controls from the EM 132 operate to determine the appropriate $r_{ref}$ values for all the servers 102 in the blade enclosure such that the total power consumed by the blade enclosure stays below its enclosure power budget 134. The operation of the EM 132 is further described below.

At 324, the SM 122 at each server 102 determines the power budget for each individual server 102 to ensure that the power consumption of the server 102 does not exceed its local power budget 124. Thus, the SM 122 outputs controls for each server 102 based on an observed difference between the local power budget 124 and the detected power consumption of the server 102 as provided by the associated sensor module Sp 112. The output power controls from the SM 122 provide the appropriate $r_{ref}$ value for the server 102. For example, if the local power budget 124 is exceeded, the SM 122 increase the $r_{ref}$ value for the server 102 in order to reduce power, at the expense of possible performance loss.

At 326, the EC 104 at each server 102 periodically optimizes the resource utilization of the associated server 102, through optimization of the clock frequency or P-state of the server 102, by regulating the resource utilization of the server 102 around its target value $r_{ref}$ as provided by the maximum of the calculated $r_{ref}$ values from the EM 132 (if the server 102 is a part of a blade enclosure) and the SM 122. Otherwise, the target value $r_{ref}$ is as provided by the SM 122. Thus, the EC 104 operates to adjust the actuator 106 for the server 102 to resize the "resource container" of the server 102 by modifying the P-state of the server 102, wherein a higher P-state corresponds to a higher power consumption, and a lower P-state corresponds to a lower power consumption but at the expense of possible performance loss.

As the VMC 152 periodically adjusts the placement of workloads on all the servers 102, the detected power consumption by the servers 102 correspondingly changes to affect the decisions made by the other power controllers (EC 104, SM 122, EM 132, and GM 142) in the UPM architecture 100, and the method 300 repeats 312-328 until the UPM architecture 100 converges to a desired steady state, as further described below. The desired steady state depends on the demand of the workloads, which may be time-varying. For example, if the workload demand changes periodically, so does the steady state. Thus, the desired steady state may be dynamically changing.

In one embodiment, the UPM architecture 100 may be realized using different designs for each of the power controllers (e.g., EC, SM, EM, GM, and VMC) in the architecture 100. To facilitate the presentation of designs for the power controllers, the following power consumption and workload performance models are approximated using linear functions at different P-states:

$$\text{pow} = g_i(r) = c_i(r) + d_i\ i=1,2,3,4. \qquad \text{Equation 1}$$

$$\text{perf} = h_i(r) = a_i(r)\ i=1,2,3,4. \qquad \text{Equation 2}$$

Equation (1) is the power model and Equation (2) is the performance model. Both models are used as the basis for the design of the power controllers in the UPM architecture 100. It should be noted that the values of the parameters, $c_i$, $d_i$ and $a_i$, are dependent on both the type of the server 102 and the nature of the workload. It is also worth noting that the power model does account for power consumptions from other parts of the server, including memory and disk. This is done by adding a constant offset $d_i$ to the Equation 1 that accounts for the basic power consumption even when the processor is idle. Finally, the inventors have observed that there is more power saving when the processor switches from P-states $p_0$ or $p_1$ to one of $p_2$, $p_3$ and $p_4$ than that from changing among the last three P-states. The inventors have further verified that the aforementioned power and performance models satisfy the following conditions that are key to the effectiveness of the feedback power controllers: 1) for a given P-state or clock frequency of the processor in a server 102, resource utilization is a monotonically increasing function of the workload performance; 2) for a given level of workload performance, resource utilization is a monotonically decreasing function of the processor's clock frequency; 3) for a given P-state or clock frequency of the processor, power consumption of a server 102 is monotonically increasing function of the resource utilization; and 4) for a given level of workload performance, power consumption of a server is a monotonically increasing function of the clock frequency of the processor.

The various power controllers in the UPM architecture 100 are now discussed with reference to Table 1 for a summary of the notations used in the discussion.

TABLE 1

| | | |
|---|---|---|
| Server | power consumption | pow |
| | static power budget | CAP_LOC |
| | dynamic power budget | cap_loc |
| | performance | perf |
| | P-states | $p_0, p_1, p_2, p_3, p_4$ |
| | desired clock frequency | f |
| | quantized clock frequency | $f_Q$ |
| | target utilization | $r_{ref}$ |
| | measured utilization | r |
| Enclosure | power consumption | pow_enc |
| | static power budget | CAP_ENC |
| | dynamic power budget | cap_enc |
| Group | power consumption | pow_grp |
| | power budget | CAP_GRP |
| Virtual Machine | virtualization overhead | $OH_v$ |
| | migration overhead | $OH_M$ |
| Workload | number of workloads | n |
| | demand for capacity | D |

TABLE 1-continued

| | | |
|---|---|---|
| System Property | placement on servers | X |
| | number of servers | m |
| | number of enclosures | l |
| | relationship between servers & enclosures | M |
| Control Interval | efficiency control (EC) | $T_{eff}$ |
| | server manager (SM) | $T_{loc}$ |
| | enclosure manager (EM) | $T_{enc}$ |
| | group manager (GM) | $T_{grp}$ |
| | VM Controller (VMC) | $T_{vm}$ |
| Controller Gain | efficiency control (EC) | $\lambda$ |
| | server manager (SM) | $\beta_{loc}$ |
| | group manager (GM) | $\beta_{loc}$ |

Figure 4:
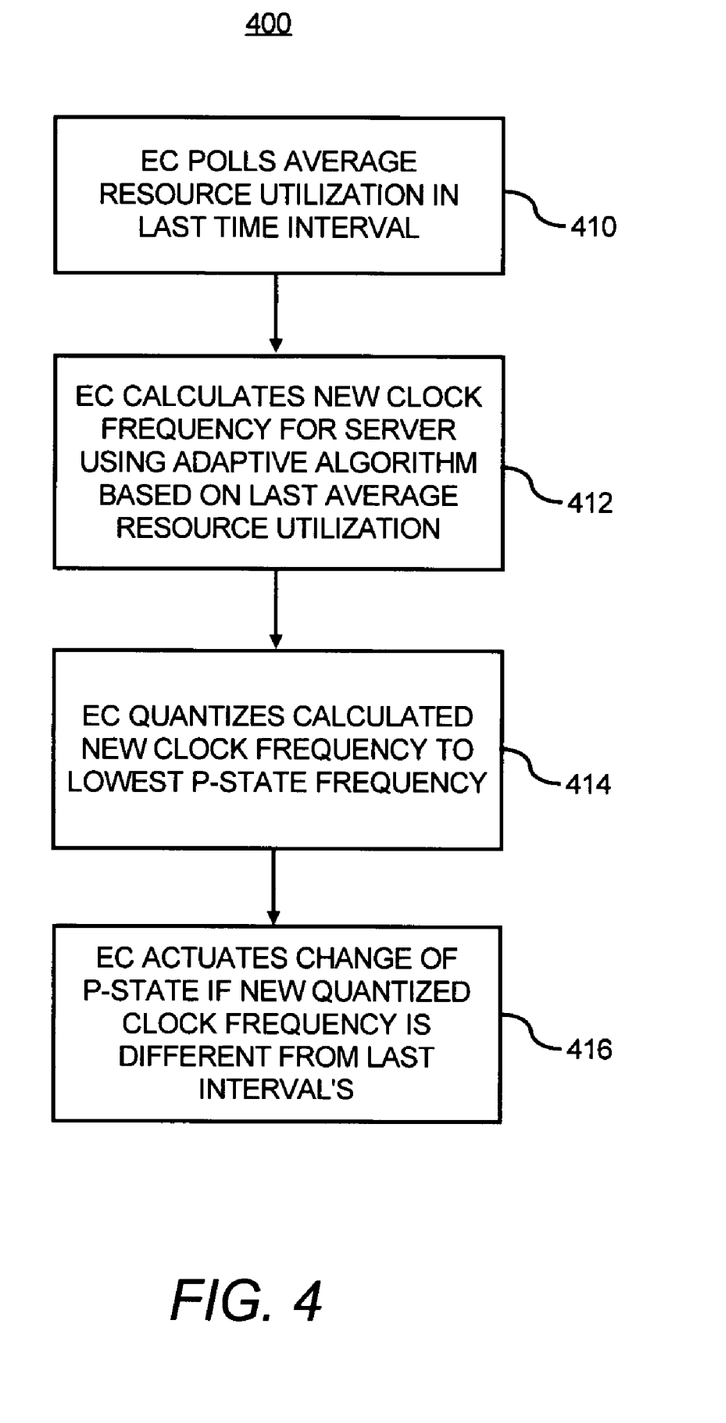
FIG. 4 illustrates a method for implementing a power efficiency controller, in accordance with one embodiment.

FIG. 4 illustrates a method 400 for implementing an EC 104, in accordance with one embodiment. For illustrative purposes only and not to be limiting thereof, the method 400 is discussed in the context of the UPM architecture 100 illustrated in FIG. 1. For each server 102, as the workload changes, the EC 104 automatically tunes the clock frequency in every control interval $T_{eff}$ in order to maintain the resource utilization around its target, $r_{ref}$. More specially, at the beginning of each interval k, the EC 104 performs the method 400 described below.

At 410, the EC 104 polls or computes the average resource utilization in the last time interval, r(k−1).

At 412, the EC 104 calculates the new desired clock frequency using the adaptive algorithm, $$f(k) = f(k-1) - \lambda \frac{f_Q(k-1)r(k-1)}{r_{ref}}(r_{ref} - r(k-1)),\qquad \text{Equation 3}$$

where $f_Q(k-1)$ is the clock frequency used in the last interval.

At 414, the EC 104 quantizes f(k) by letting $f_Q(k)$ be the lowest P-state frequency that is above f(k).

At 416, the EC 104 actuates the change of P-state with the actuator 106 if $f_Q(k)$ is different from $f_Q(k-1)$. Accordingly, Equation (3) implements an integral control law where the change in the clock frequency is proportional to the observed error in utilization. The adaptive integral gain $$\lambda \frac{f_Q(k-1)r(k-1)}{r_{ref}}$$

that determines the aggressiveness of the controller is self-tuning such that, for a given utilization error, the increment of the frequency is proportional to the current utilization, or operational frequency, but inversely proportional to the utilization target as understood in the art for an adaptive utilization controller. The EC 104 accomplishes two tasks. First, when the demand from the workload drops for server 102, the measured utilization is likely to be below the target utilization. The EC 104 then tells the processor of the server 102 to switch to a lower P-state in order to track the target utilization, but leading to reduced power consumption as well. Second, if the demand from the workload increases, the same processor is operable to switch to a higher P-state so that workload performance does not suffer. Similar adaptation occurs when the target utilization, $r_{ref}$, is changed. That is, when $r_{ref}$ is increased, the clock frequency may be reduced leading to lower power consumption.

Figure 5:
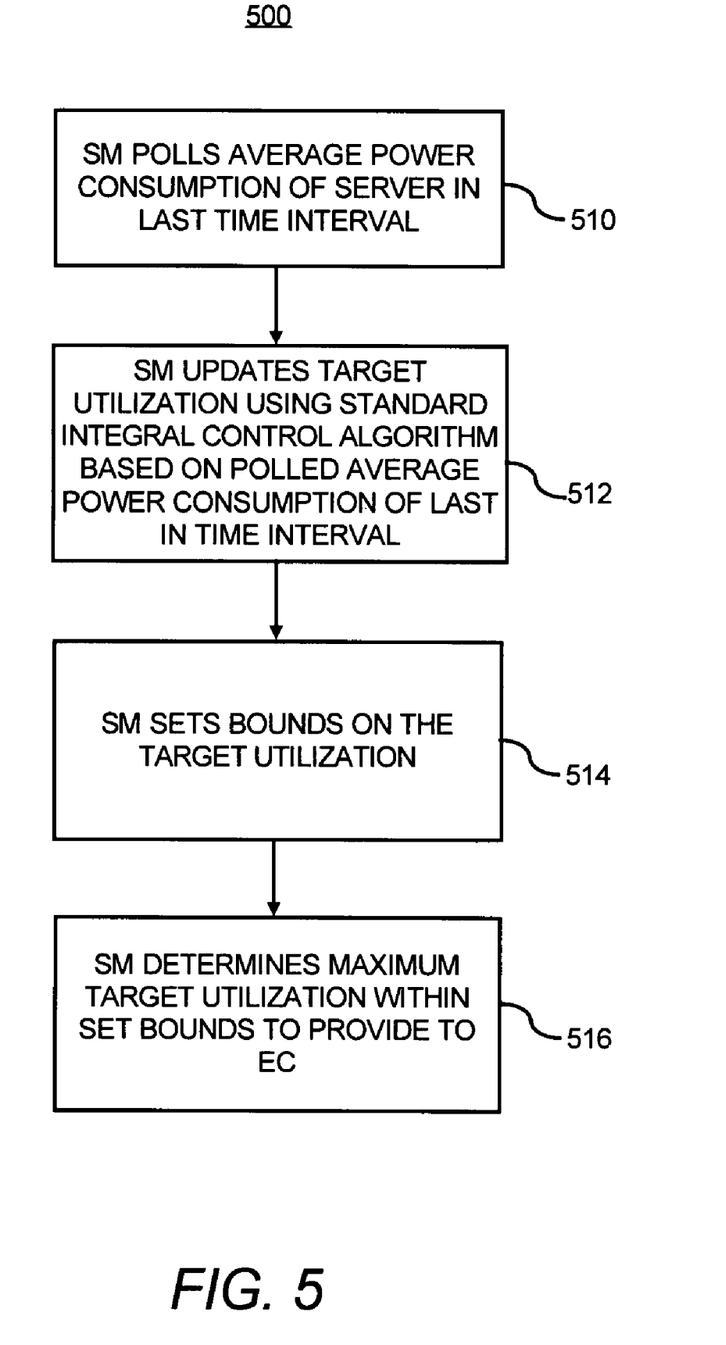
FIG. 5 illustrates a method for implementing a service manager controller, in accordance with one embodiment.

FIG. 5 illustrates a method 500 for implementing a SM 122, in accordance with one embodiment. For illustrative purposes only and not to be limiting thereof, the method 500 is discussed in the context of the UPM architecture 100 illustrated in FIG. 1. The SM 122 ensures that the static server-level power budget, CAP_LOC, 124 is not exceeded by tuning the target utilization of the power-efficiency loop 110, if necessary. The SM 122 follows similar actions as the EC 104 does, but at a longer control interval of $T_{loc}$ (thus, at a different time constant). That is, at the beginning of each interval j, the SM 122 performs the method 500 as described below.

At 510, the SM 122 polls or gets the average power consumption of the server 122 in the last time interval (j−1).

At 512, the SM 122 updates the target utilization using the standard integral control algorithm, $$r_{ref}(j)=r_{ref}(j-1)-\beta_{loc}(\text{cap\_loc}-\text{pow}(j-1)). \qquad \text{Equation 4}$$

At 514, the SM 122 sets the bounds on the target utilization, $$r_{ref}(j) \leftarrow \min(2.0, \max(0.75, r_{ref}(j))). \qquad \text{Equation 5}$$

At 516, the SM 122 determines the maximum target utilization and feeds it to the EC 104, $$r_{ref}(j) \leftarrow \max(r_{ref}(j), r_{ref,Em}), \qquad \text{Equation 6}$$

where $r_{ref,Em}$ is the target utilization computed by the EM 132. It should be noted that this maximization of the target utilization is applicable for those servers 102 that belong to a subsystem or blade enclosure that employs the EM 132. Thus, there is no maximization of the target utilization value for an individual server 102 in the UPM architecture but not in any subsystem or blade enclosure.

Equation (4) shows that the target utilization $r_{ref}$ is increased when the measured power consumption exceeds the current local budget cap_loc. This causes the EC 104 in the inner loop 110 to reduce the clock frequency leading to lower power consumption as discussed earlier. Similarly, when the power consumption is below the local power budget 124, the target utilization is reduced resulting in a higher clock frequency and a power consumption closer to the local power budget 124. The stability of the SM 122 may be guaranteed by imposing an upper bound on the gain parameter $\beta_{loc}$, which may be computed from the given power and performance models.

The output target utilization from the SM 122 is limited by three bounds. First, it is upper bounded by a value larger than 1.0 (or 100%). In one embodiment, an upper bound of 2.0 is used to address the potential loss of tuning capability of the EC 104 when the actual utilization is at 100% as the demand exceeds the capacity. If $r_{ref}$ is set to 1.0 instead, the error term in Equation (3) becomes zero, causing the clock frequency to remain fixed even when the local power budget 124 is not met. With an upper bound larger than 1.0, in the same scenario, the nonzero error term in Equation (3) may push down the clock frequency until the local power budget 124 is met or the P-state with the lowest frequency is reached. Second, the target utilization is lower bounded by 75% in order to maintain a reasonably high resource utilization in the server 102 even when the actual power consumption is below the local power budget 124. Third, the target utilization is lower bounded by $r_{ref,Em}$. It means that, between the utilization targets imposed by the SM 122 and the EM 132, the more aggressive or maximum target utilization is used so that both the local power budget 124 and the enclosure budget 134 are met.

The EM 132 functions similarly as the SM 122, except that its goal is to enforce the enclosure-level power budget, the minimum of Budget 134 and that set by GM 142. An integral controller is applied to compute the target utilization for the power-efficiency loop 110 as follows:

$$r_{ref,EM}(i) = r_{ref,EM}(i-1) - \beta_{enc}(\text{cap\_enc} - \text{cap\_enc}(i-1)). \quad \text{Equation 7}$$

It should be noted that the EM 132 is driven by the observed error between the enclosure-level power budget 134 and the detected power consumption of the blade enclosure during each control interval $T_{enc}$. To ensure stability as the number of servers 102 in the enclosure increase, the controller gain $\beta_{enc}$ is inversely proportional to this number.

Figure 6:
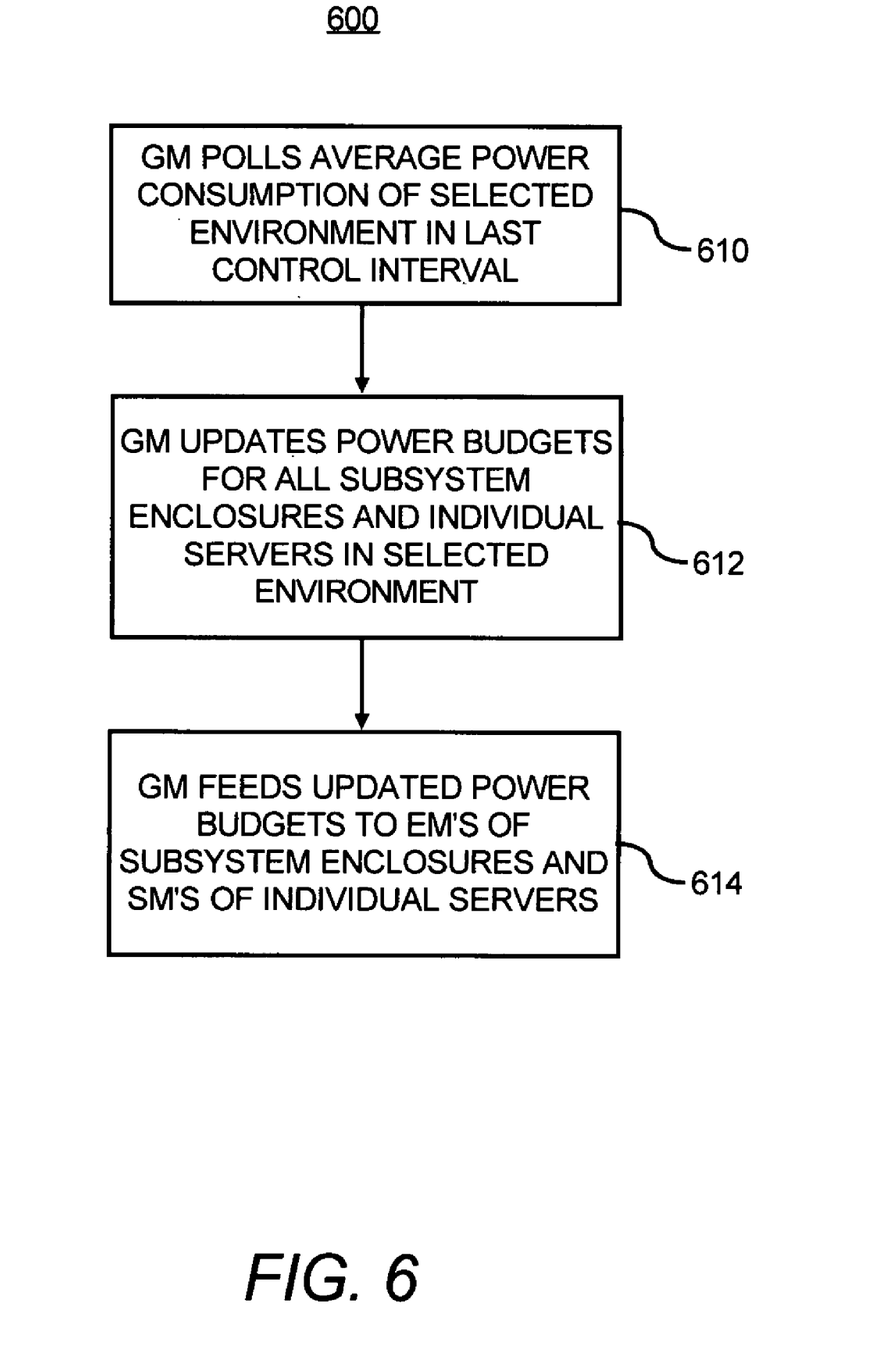
FIG. 6 illustrates a method for implementing a group manager controller, in accordance with one embodiment.

FIG. 6 illustrates a method 600 for implementing a GM 142, in accordance with one embodiment. For illustrative purposes only and not to be limiting thereof, the method 600 is discussed in the context of the UPM architecture 100 illustrated in FIG. 1. The GM 142 determines the power budgets for the individual subsystems or blade enclosures and the individual servers. Again, an integral controller is implemented in the GM 142, driving the changes in the power budgets based on the observed error between the group-level budget, CAP_GRP, 144 and the aggregate or total power consumption of the group. More specifically, for each control interval $T_{grp}$, the GM 142 performs the method 600 as described below.

At 610, the GM 142 polls or gets the average power consumption, pow_grp, of the group, i.e., entire rack enclosure, in the last control interval.

At 612, the GM 142 updates the power budgets for all subsystem or blade enclosures and all individual servers 102 outside of the blade enclosures. For each blade enclosure, its power budget is calculated as follows, $$\text{cap\_enc} = \text{cap\_enc} + \frac{\beta_{grp} n_E}{n_G}(\text{CAP\_GRP} - \text{pow\_grp}), \quad \text{Equation 8}$$

$$\text{cap\_enc} \leftarrow \min(\text{cap\_enc}, \text{CAP\_ENC});$$

and for each individual server 102, its power budget is calculated as follows, $$\text{cap\_loc} \leftarrow \min(\text{cap\_loc}, \text{CAP\_LOC}); \quad \text{Equation 9}$$

where $n_E$ and $n_G$ are the number of servers 102 in that blade enclosure, and the total number of servers in the group or rack enclosure.

At 614, the GM 142 feeds the determined budgets to the corresponding EM's 132 (for the blade enclosures) and SM's 122 (for the individual servers 102). It should be noted that the scaling of the controller gains for the GM 142 is based on the policy to distribute the group-level power budget 144 uniformly to all the servers 102 in the group or rack enclosure, inside or outside of a subsystem or blade enclosure therein. Alternative embodiments are contemplated wherein other scaling strategy may be used for other types of policies, such as those that prioritize between different servers or blade enclosures, or those that allocate the budgets proportionally to the power demands. The actual power budgets used by the EM's 132 and the SM's 122 are upper bounded by their own static power budgets (134 and 124, respectively) so that both caps may be met.

In one embodiment, the optimization problem solved by the VMC 152 is formulated based on but not limited to the following conditions: 1) each VM hosts one workload with time-varying resource demand, 2) each physical server 102 may host multiple VMs, 3) VMs may be placed or migrated to any server 102, and 4) An idle server, that is hosting no virtual machines, is turned off and its power consumption will be zero. The VM consolidation process is then to find the optimal solution of the following problem given the initial VM placement $X^0$:

$$\text{Min} \sum_{i=1}^{m} pow_i + w \sum_{i=1}^{m} \sum_{j=1}^{n} OH_M |X_{i,j} - X_{i,j}^0|,$$

$$s.t. \sum_{j=1}^{n} X_{i,j} r_j (1 + OH_V) \leq \bar{r}, i = 1, 2, \ldots, m,$$

$$pow_i \leq \text{CAP\_LOC}_i, i = 1, 2, \ldots, m,$$

$$\sum_{j=1}^{m} M_{i,j} pow_j \leq \text{CAP\_ENC}_i, i = 1, 2, \ldots, l,$$

$$\sum_{j=1}^{m} pow_j \leq \text{CAP\_GRP},$$

$$\sum_{j=1}^{m} X_{i,j} = 1, i = 1, 2, \ldots, n,$$

$$X_{i,j} = \{0, 1\}, i = 1, 2, \ldots m, j = 1, 2, \ldots, n.$$

It should be noted that only the capacity and power budget constraints are modeled. The VM migration overhead $OH_M$ is taken as part of penalty of the cost, and the virtualization overhead is modeled as a percentage of the resource utilization. A utilization bound $\bar{r}$ is applied so that one buffer of the capacity is reserved for the variance of demand, e.g., it is set to 75% in default. To solve this problem online, power and performance models are known a priori so that the power consumption and performance may be predicted based on estimation of demand. Many algorithms are available to solve this '0-1' integer programming problem. For example, a greedy bin-packing algorithm may be employed here to search a new placement solution that satisfies all the constraints, which may be an approximation of the optimal solution.

The systems and methods for a unified power management (UPM) architecture or framework as described in FIGS. 1-6 above employ power controllers that rely actual measurements of power consumption and resource utilization of each server 102. However, alternative embodiments are contemplated wherein existing modeling or approximation techniques may be employed to approximate or estimate the power consumption, the resource utilization, or both of one or more servers 102 in the event that such actual measurements are not available for desired. Thus, the interfaces (shown as "+" circles) for the information exchange and coordination of control across the multiple power controllers may be based on inadequate information or proxies for the actual information.

Accordingly, the UPM architecture as described in various embodiments herein brings together individually-complex power optimizations in a scalable deployment from a rack enclosure with multiple electronic components therein to a large data center with multiple such rack enclosures. Furthermore, the UPM architecture provides system operators with a tool to evaluate possible power management scenarios or techniques and tradeoffs between them. For example, from the power-control point of view, one may vary parameters related to local power-efficiency loops (e.g., 110), power budget thresholds (e.g., 124, 134, and 144), and control policies (e.g., distributing the group-level power budget uniformly to all the servers 102 in the group). From the infrastructure point of view, the parameters related to VM deployment, data center configuration, and system workloads may be varied. Similarly, from the coordination architecture point of view, one may vary the nesting of power controllers, the choice between VM consolidation and power controllers, and the time constants to evaluate local policies as opposed to global policies. Table 2 provides a summary of some of the high-level parameters that may be varied in a UPM architecture embodiment for power management evaluations and sample values that may be used to evaluate or instantiate a power management scenario.

TABLE 2

| Category | Design choice | Description | Base instantiation |
|---|---|---|---|
| Power Control | Local efficiency control | Control the power consumption at per-server level | r_ref = 75-95%. control equation: Equation (3) container resizing: quantize the frequency to that of a p-state power budget threshold: 10% off from local max power budget policy: Equation (4) |
| | Enclosure level control | Control the power consumption at enclosure level. Which server to throttle? What knob to use? What level to throttle to? | power budget threshold: 15% off from sum of local max power budget policy: Equation (7). |
| | Data center level control | Control the power consumption at rack and cluster level. Which enclosure or rack to control? What level to throttle to? | power budget threshold: 20% off from sum of local max power budget policy: Equations (8) and (9) |
| Infrastructure | VM Deployment | Which VM infrastructure to use? What migration and consolidation mechanisms to use? | virtualization overhead: 10% in terms of utilization VM migration overhead: negligible for assumed time constants VM consolidation policy: greedy heuristics |
| | Data center configuration | Number of stand-alone servers, number of blades in enclosure, number of Ems, GMs, etc; Power characteristics | 60 homogeneous servers: 2 × 20 blades enclosures + 20 servers power model: linear - based on calibration of turion-based blade; 5 p-states; idle 50% of peak; no transition overhead times (Equation (1)) |
| | Workload assumptions | Mix of workloads; performance characteristics | Enterprise-class utilization traces; work dropped if it cannot be done performance model: linear - based on calibration of turion-based blade (Equation (2)) |
| Co-ordination Architecture | Coordination mechanisms | Choice of controllers, feedback loops and APIs to use for co-ordination | No controllers All controllers and VM All controllers, but no VM Only VM level control |
| | Coordination between loops | All controllers present? Order of priorities; time constants | local efficiency: 1s Local capping: 5s Enclosure capping: 50s Data-center capping: 100s VM-level consolidation: 500s |

Regarding tradeoffs between the various techniques to control power, the inventors have found that UPM architectures with VM consolidation and migration result in greater power savings compared to other configurations or techniques. This is primarily due to the wider range of power control available to the VMC (turning machines on/off) versus at the local power controllers (P-states control). However, these UPM architectures also result in greater performance loss and more lower budget violations. For example, for enterprise workloads in a distributed or enterprise environment, the All Controllers/VMC configuration (i.e., a UPM architecture that employs all aforementioned power controllers along with a VMC) gets 60-70% power savings compared to the No Controllers/No VMC configuration, but with about 15% degradation in performance in one case and 3-6% power budget violations. In contrast, the All Controllers/No VMC configuration gets about 20% power savings, but with marginal performance loss and power budget violations. These results are with simple policy choices, and it is expected the performance and power budget violation results with the All Controllers/VMC and the power savings with the All Controllers/No VMC to improve with more intelligent policies. Also, it should be noted that the All Controllers/VMC configuration performs better than the No Controllers/VMC configuration—illustrating that there are potential advantages to having co-ordination between the controllers in achieving a better global function. The inventors also have found that the UPM architecture shows similar behavior across the various mixes of workloads.

What has been described and illustrated herein is an embodiment along with some of its variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A power management system for providing a unified power management of at least one electronic system in a selected environment, the at least one electronic system includes a plurality of electronic components comprising:

a first controller module operating at the at least one electronic system in the selected environment to generate a first power control of the each electronic component based at least on a system power budget for the at least one electronic system;

a second controller module operating at each of the electronic components to generate a second power control of the each electronic component based at least on a component power budget for the each electronic component;

a third controller module operating at each of the electronic components to modify a power-performance state of the each electronic component based on a target resource utilization level, wherein the target resource utilization level is based at least on the first and second power controls; and one or more interfaces operating to provide information exchange and coordination of control across at least the first, second, and third controller modules, wherein some of the electronic components in the at least one electronic system are enclosed in a subsystem of the at least one electronic system, and the power management system further comprises:

a fourth controller module operating at the subsystem to provide a third power control of each of the electronic components in the subsystem based at least on a subsystem power budget for the subsystem.

2. The power management system of claim 1, wherein:
the at least one electronic system includes a rack enclosure having a plurality of servers as the plurality of electronic components therein; and
the one or more interfaces are based on one of inadequate information about each of the plurality of servers and proxies of actual measured information about the each server.

3. The power management system of claim 1, wherein the second power control is the target resource utilization level, and the second power control is generated based at least on a higher one of the component power budget and the system power budget.

4. The power management system of claim 1, wherein the third power control is generated based at least on a lower one of the subsystem power budget and the system power budget.

5. The power management system of claim 4, wherein the target resource utilization level of each of the electronic components in the subsystem is based on whichever one of the second power control, as from the second controller module for the each subsystem electronic component, and the third power control that provides a higher resource utilization level for the each subsystem electronic component.

6. The power management system of claim 5, wherein the target resource utilization level of each of the electronic components external to subsystem is the second power control from the second controller module for the each electronic component external to the subsystem.

7. The power management system of claim 1, further comprising:
a fifth controller module operating to adjust a placement of workloads on the plurality of electronic components in the electronic system to optimize a power consumption of the electronic system, wherein the first power control, the second power control, and the target resource utilization level are further based on the workload adjustment by the fifth controller module.

8. The power management system of claim 7, wherein at least some of the first, second, third, fourth, and fifth controller modules operate at different time constants.

9. A method for providing a unified power management of at least one electronic system in a selected environment, the at least one electronic system includes a plurality of electronic components, the method comprises:
receiving a predetermined system power budget for the at least one electronic system;
receiving a predetermined local power budget for each of the plurality of electronic components;
detecting a power consumption of each of the plurality of electronic components running one or more workloads therein;
aggregating the detected power consumptions of the plurality of electronic components into a total system power consumption of the electronic system;
determining a first power budget for each of the plurality of electronic components to ensure that the total system power consumption is substantially equal to or less than the predetermined system power budget;
determining a first target utilization for each of the plurality of electronic components, based at least on the first power budget determined for the each electronic component, to ensure that the power consumption of the each electronic component is substantially equal to or less than the predetermined local power budget for the each electronic component; and
optimizing a resource utilization of each of the plurality of electronic components based at least on the first target utilization for the each electronic component,
wherein some of the electronic components in the at least one electronic system are enclosed in a subsystem of the at least one electronic system, the method further comprises:
receiving a predetermined subsystem power budget for the subsystem;
aggregating the detected power consumptions of the subsystem electronic components into a detected subsystem power consumption of the subsystem; and
determining a second target utilization for each of the subsystem electronic components to ensure that the detected subsystem power consumption is substantially equal to or less than the subsystem power budget.

10. The method of claim 9, wherein determining the first target utilization for each of the plurality of electronic components comprises:
comparing the first power budget of the each electronic component with the predetermined local power budget for at least one of the plurality of electronic components to select the lower power budget of the two; and
determining the first target utilization for the at least one electronic component based on a difference between the selected lower power budget and the detected power consumption of the each electronic component.

11. The method of claim 9, wherein determining the first power budget for each of the plurality of electronic components comprises:
polling an average power consumption of the electronic system from the detected total system power consumption;
updating the first power budget for each of the plurality of electronic components based on the polled average power consumption; and
providing the updated first power budget for the determining of the first target utilization for the each electronic component.

12. The method of claim 9, wherein determining the first target utilization for each of the plurality of electronic components comprises:
determining the first target utilization for at least one subsystem electronic component based on a difference between the local power budget for the at least one subsystem electronic component and the detected power consumption for the least one subsystem electronic component.

13. The method of claim 9, wherein determining the first target utilization for each of the plurality of electronic components comprises:
polling an average power consumption of each of the electronic components from the detected power consumption of the each electronic component; and
updating the first target utilization for each of the electronic components based on the polled average power consumption.

14. The method of claim 9, further comprising:
assigning the one or more workloads to the plurality of electronic components in accordance with a power optimization of the selected environment based on virtual machine (VM) consolidation.

15. The method of claim 9, wherein optimizing the resource utilization of each of the plurality of electronic components comprises:
Comparing the first and second target utilizations to obtain and determine a higher target utilization of the two;

first optimizing the resource utilization of each of the subsystem electronic components in the subsystem based on the higher target utilization.

16. The method of claim 15, wherein optimizing the resource utilization of each of the plurality of electronic components further comprises:

second optimizing the resource utilization of the remaining electronic components external to the subsystem by using the first target utilization as the resource utilization of the each remaining electronic component.

17. The method of claim 16, further comprising:

determining a maximum target utilization from the updated first and second target utilizations.

18. A non-transitory computer readable medium on which is encoded programming code for providing a unified power management of at least one electronic system in a selected environment, the at least one electronic system includes a plurality of electronic components, the encoded programming code is executable by a computer to:

receive a predetermined system power budget for the at least one electronic system;

received a predetermined local power budget for each of the plurality of electronic components;

detect a power consumption of each of the plurality of electronic components running one or more workloads therein;

aggregate the detected power consumptions of the plurality of electronic components into a total system power consumption of the electronic system;

determine a first power budget for each of the plurality of electronic components to ensure that the total system power consumption is substantially equal to or less than the predetermined system power budget;

determine a first target utilization for each of the plurality of electronic components, based at least on the first power budget determined for the each electronic component, to ensure that the power consumption of the each electronic component is substantially equal to or less than the predetermined local power budget for the each electronic component; and optimize a resource utilization of each of the plurality of electronic components based at least on the first target utilization for the each electronic component, wherein some of the electronic components in the at least one electronic system are enclosed in a subsystem of the at least one electronic system, the encoded programming code is further executable by a computer to:

receive a predetermined subsystem power budget for the subsystem;

aggregate the detected power consumptions of the subsystem electronic components into a detected subsystem power consumption of the subsystem; and determine a second target utilization for each of the subsystem electronic components to ensure that the detected subsystem power consumption is substantially equal to or less than the subsystem power budget.

* * * * *

UNITED STATES PATENT AND TRADEMARK OFFICE
CERTIFICATE OF CORRECTION

| | | |
|---|---|---|
| PATENT NO. | : 7,861,102 B1 | Page 1 of 1 |
| APPLICATION NO. | : 11/796962 | |
| DATED | : December 28, 2010 | |
| INVENTOR(S) | : Parthasarathy Ranganathan et al. | |

It is certified that error appears in the above-identified patent and that said Letters Patent is hereby corrected as shown below:

In column 16, line 47, in Claim 12, delete "the least one" and insert -- the at least one --, therefor.

In column 16, line 66, in Claim 15, delete "Comparing" and insert -- comparing --, therefor.

Signed and Sealed this
First Day of May, 2012

David J. Kappos
*Director of the United States Patent and Trademark Office*